United States Patent [19]
McDonald

[11] Patent Number: 5,995,292
[45] Date of Patent: Nov. 30, 1999

[54] APPARATUS FOR ADJUSTABLE SPHERICAL ABERRATION CORRECTION

[75] Inventor: Mark McDonald, Mountain View, Calif.

[73] Assignee: Siros Technologies, Inc., San Jose, Calif.

[21] Appl. No.: 09/097,761

[22] Filed: Jun. 16, 1998

[51] Int. Cl.$^6$ .............................. G02B 27/14; G02B 3/02
[52] U.S. Cl. ........................................... 359/637; 359/708
[58] Field of Search ................................... 359/637, 744, 359/708, 728

[56] References Cited

U.S. PATENT DOCUMENTS

| | | | |
|---|---|---|---|
| 5,097,464 | 3/1992 | Nishiuchi et al. | 369/112 |
| 5,105,408 | 4/1992 | Lee et al. | 369/44.15 |
| 5,125,750 | 6/1992 | Corle et al. | 359/819 |
| 5,157,555 | 10/1992 | Reno | 359/823 |
| 5,202,875 | 4/1993 | Rosen et al. | 369/94 |
| 5,235,581 | 8/1993 | Miyagawa et al. | 369/44.12 |
| 5,497,359 | 3/1996 | Mamin et al. | 369/44.15 |
| 5,526,181 | 6/1996 | Kunick et al. | 359/613 |
| 5,610,901 | 3/1997 | Best et al. | 369/275.1 |
| 5,677,903 | 10/1997 | Holtslag et al. | 369/112 |
| 5,712,842 | 1/1998 | Yamamoto et al. | 369/112 |
| 5,726,436 | 3/1998 | Oka et al. | 250/201.5 |
| 5,729,393 | 3/1998 | Lee et al. | 359/819 |
| 5,764,613 | 6/1998 | Yamamoto et al. | 369/112 |

FOREIGN PATENT DOCUMENTS

| | | |
|---|---|---|
| 0727777 | 2/1996 | European Pat. Off. . |
| 8212579 | 8/1996 | Japan . |
| 8315404 | 11/1996 | Japan . |

OTHER PUBLICATIONS

Yamamoto, K., et al., .8 numerical aperture two element objective lens for the optical disk, Jpn., J. Appl. Phys. vol. 36, pp. 456–459, 1997.

Ichimura, I., et al., High–density optical recording using a solid immersion lens, Applied Optics, 36(19), pp. 4339–4348, 1997.

Kino, G., Near field optical storage, Optics & Photonics News, pp. 38–39, Nov. 1997.

Osato, K., et al., A rewritable optical disk system with over 10GB of capacity, Optical Data Storage, 1998 Tech. D. G. Ser. vol. 8, May 10–13, 1998, Conference Edition.

Hasegawa, K. et al., Extended capacity and high speed magnetic field modulation recording for 3.5" magnetooptical disk, IEEE Trans. J. Mag., 8(6), pp. 396–404, 1993.

Yamaguchi, S. et al., New flying optical head for high speed accessing, SPIE vol. 1248, 96–103, 1990.

*Primary Examiner*—Scott J. Sugarman
*Assistant Examiner*—Ricky Mack
*Attorney, Agent, or Firm*—Lumen Intellectual Property Services

[57] ABSTRACT

A pair of compensation lenses which provide an adjustable amount of spherical aberration. Each compensation lens has an external surface and an internal surface. The internal surfaces face each other and define an air gap spacing between them. The external surfaces are preferably planar. The internal surfaces are purely aspheric and therefore have an absence of spherical power and an absence of spherical curvature. The amount of spherical aberration compensation is determined by adjusting an air gap spacing between the internal surfaces. The spherical aberration provided by the lenses can be negative, positive, or zero. For compensation of negative spherical aberration present when focusing light into a data storage medium, the compensation lenses should provide positive spherical aberration. The absence of spherical power characteristic of the compensation lenses allows them to be located far from an objective lens which requires spherical aberration compensation. Also, the absence of spherical power renders the focusing characteristics of an optical system independent from the air gap spacing thickness. Further, absence of spherical power renders the numerical aperture of the optical system unchanged by variations in air gap spacing.

40 Claims, 5 Drawing Sheets

APPARATUS FOR ADJUSTABLE SPHERICAL ABERRATION CORRECTION

FIELD OF THE INVENTION

This invention relates generally to optical data storage devices. More particularly, the present invention relates to an apparatus for providing adjustable spherical aberration correction when reading and writing data at different depths within a data storage medium.

BACKGROUND OF THE INVENTION

The use of compact disk (CD) data storage is well known in the art. CDs comprise a data layer residing beneath a clear coating layer having a well defined thickness. The data layer has marks of varying reflectance which are read by a laser beam focused on the data layer. The laser beam must be focused to a spot of minimal size in order for the system to achieve maximum data density, which is desired.

In order for the reading laser beam to be focused to a spot of minimal size, the optical system which focuses the laser beam must be designed to compensate for the distorting effects of spherical aberration. Spherical aberration has the effect of enlarging the focused spot size, which generally precludes achieving maximum data density.

The amount of spherical aberration, however, varies with the thickness of the clear coating layer. For CDs having a single data layer and a clear coating of a known thickness, an objective lens assembly can be designed to compensate for the well defined magnitude of spherical aberration present. An optical focusing system designed for a given clear coating thickness cannot be used on a CD having a substantially different clear coating thickness.

It is expected that future optical data storage systems may use multiple data layers located at different depths. Such a system will require an adjustable spherical aberration compensation capability. The spherical aberration compensation will need to be different for each data layer.

More generally, spherical aberration requires correction in any system which must focus light to a minimal spot size at various depths within a material. Such systems are not limited to the current optical data storage systems.

U.S. Pat. No. 5,202,875 to Rosen et al. discloses an optical data storage system using multiple data layers. Different embodiments of the invention exploit different methods of providing spherical aberration correction. Stepped plates having well defined thicknesses disposed between the objective lens and CD are used in one embodiment. The stepped plates have different thicknesses and are moved in and out of the optical path such that the light always passes through the same thickness of material (clear coating material) before hitting the data layer. Paired wedges and rotatable stepped wedges also perform the same function.

Another aberration compensation technique disclosed by Rosen in the above referenced patent 5,202,875 involves the use of two lenses (a convex lens and a concave lens) in addition to the objective lens assembly. The lenses are moved relative to one another to provide controlled spherical aberration correction of arbitrary magnitude. The distance between the lenses determines the magnitude of aberration correction. Rosen also discloses using an aspheric lens with zero focal power. The compensator of Rosen is characterized in that the spherical aberration compensation lens disclosed by Rosen must be located in a beam being focused, i.e. a noncollimated beam.

U.S. Pat. No. 5,610,901 to Best et al. discloses substantially the same spherical aberration compensation techniques as the 5,202,875 patent to Rosen et al.

U.S. Pat. No. 5,157,555 to Reno discloses a spherical aberration correction apparatus which uses two lenses having an adjustable air gap between them. The lenses are convex and concave, with complementary surfaces facing each other. Reno's apparatus is used in conjunction with an objective lens assembly for focusing the beam onto the data surface. Reno uses lenses which have a nonzero focal power (large spherical curvature) and so the spherical aberration compensation lenses tend to alter the distance between the objective lens and focal point as spherical aberration is adjusted. The focus adjustment and spherical aberration adjustment are coupled together, thereby complicating the adjustment procedure.

SUMMARY OF THE INVENTION

Briefly, and in general terms, the present invention provides an apparatus capable of providing adjustable spherical aberration without substantially altering other characteristics of the optical system in which the apparatus is used. For example, the preferred embodiment of the present invention does not substantially affect the focusing or numerical aperture of an optical system as the amount of spherical aberration is adjusted. The present invention provides accurate spherical aberration correction in optical systems. More particularly, the present invention can provide accurate spherical aberration correction in optical data storage systems utilizing a data storage medium having data stored at a number of different depths within the medium.

The apparatus of the present invention includes a pair of lenses disposed adjacent to each other and coaxial. Each lens has an internal surface and an external surface. The lenses are disposed such that the internal surfaces face each other and define an air gap spacing therebetween. The thickness of the air gap spacing determines the amount of spherical aberration provided by the lens pair.

The internal surfaces are preferably complementary, but may also have noncomplementary shapes. Also, the internal surfaces are aspheric or have aspheric refractive properties. Preferably, the lenses are purely aspheric, with no spherical focusing properties associated with lenses having spherical surfaces (i.e., the lens pair preferably has an infinitely long focal length). The lenses may be graded index of refraction (GRIN) lenses, conventional curved lenses, or any optical element capable of curving the path of a light beam in a manner similar to an aspheric lens. If the lenses are GRIN lenses, then the internal surfaces are preferably flat and parallel.

A presently preferred embodiment of the present invention, by way of example and not necessarily by way of limitation, includes an apparatus having a first compensation lens and a second compensation lens. The first compensation lens has a first external surface and a convex internal surface with an aspheric shape. The second compensation lens has a second external surface and a concave internal surface with an aspheric shape. The compensation lenses are coaxial. The compensation lenses are disposed such that the concave internal surface and the convex internal surface face each other and define an air gap spacing. The thickness of the air gap spacing determines the amount of spherical aberration imparted to a collimated light beam passing through the compensation lenses. Preferably, the internal surfaces of the lenses are purely aspheric.

Preferably, the external surfaces of both compensation lenses are planar. The external surfaces can also be nonplanar to provide a nominal amount of spherical aberration when the lenses are in contact.

Also preferably, the concave internal surface and convex internal surface have complementary shapes. In the case where external surfaces are planar and the internal surfaces are complementary, the lens pair will act as a flat, planar slab when the lenses are in contact.

The first and second compensation lenses can provide positive spherical aberration. This compensates for the negative spherical aberration inherent when focusing through a flat surface into a data storage medium.

Preferably, the first compensation lens and second compensation lens have a very long focal length (e.g. infinitely long). In other words, the internal surfaces have a very small component of spherical curvature.

Also preferably, the first and second lenses are disposed such that the light beam enters the first lens through the first external surface and exits the second lens through the second external surface. The light passes through the concave lens first and passes through the convex lens second. This results in the first and second lenses having a negligible effect upon numerical aperture of an optical system in which the apparatus is used. Alternatively, the first and second lenses are disposed such that light passes through the second lens first and through the first lens second, i.e. alternatively, the second lens is upstream from the first lens.

The present invention can also include an objective lens disposed coaxial with the first and second compensation lens. In this case, it is preferable for the objective lens to be located closer to the second compensation lens than to the first compensation lens. The objective lens can provide focusing into a data storage medium. In this case, the compensation lenses can have a small amount of spherical curvature so that they have a focal length which is at least 10 times longer than the focal length of the objective lens. Better still, the compensation lenses have a focal length which is at least 100 times longer than the focal length of the objective lens. Most preferably, the compensation lenses have zero spherical curvature and so have an infinitely long focal length.

DETAILED DESCRIPTION

The present invention provides a lens pair which imposes an adjustable amount of spherical aberration in a collimated light beam. The spherical aberration can be either positive or negative, but for many optical data storage applications, the spherical aberration will be positive to compensate for the negative spherical aberration caused by focusing a light beam into a data storage medium having a flat surface.

Figure 1:
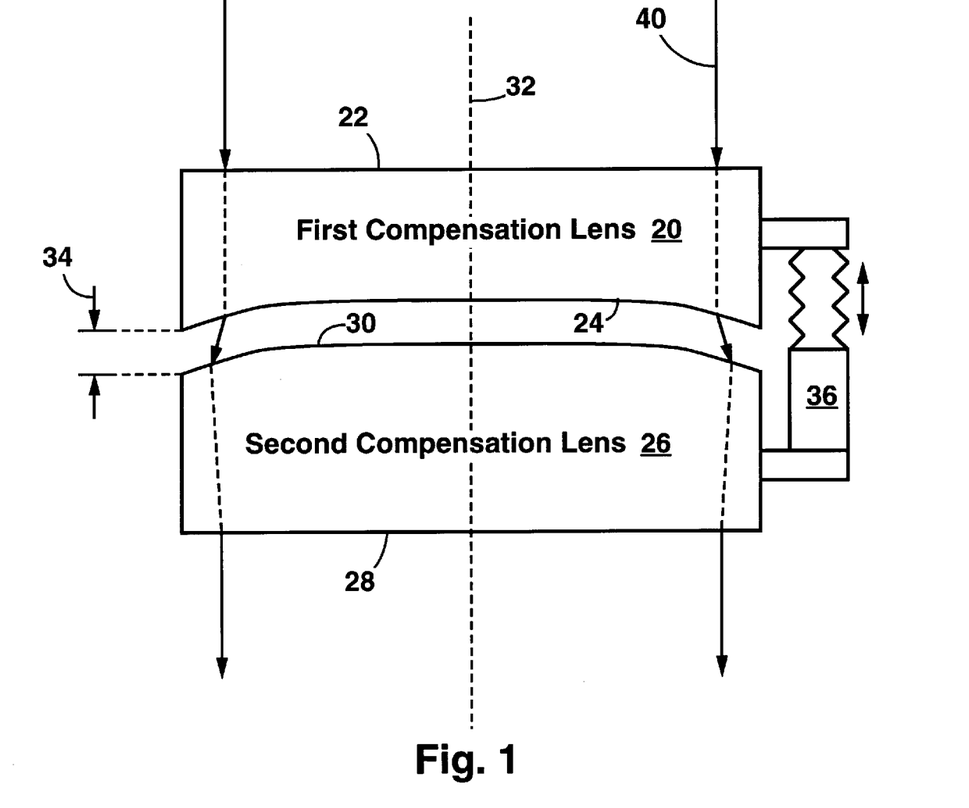
FIG. 1 is a side view of a first compensation lens and a second compensation lens according to a preferred embodiment of the present invention.

A preferred embodiment of the invention is shown in FIG. 1. A first compensation lens 20 has a first external surface 22 and a concave internal surface 24. A second compensation lens 26 has a second external surface 28 and a convex internal surface 30. The compensation lenses 20, 26 are coaxial and so share a common axis 32. The compensation lenses 20, 26 are disposed such that the convex surface 30 and concave surface 24 define an air gap spacing 34. Preferably, the compensation lenses are movable with respect to one another so that the air gap spacing 34 is adjustable. The air gap spacing 34 may be adjusted by means of an actuator such as a voice coil motor 36.

Preferably, the external surfaces 22, 28 are planar and planar parallel.

Figure 2:
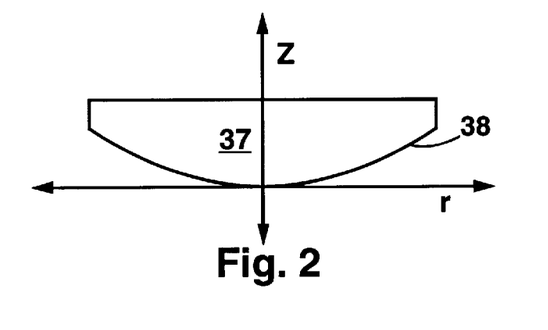
FIG. 2 is a graph illustrating how a lens surface is described by a power series.

The shape of a lens surface can be expressed in terms of a power series. FIG. 2 shows a lens 37 with a lens surface 38 which illustrates how the variables of a power series expressing a lens surface shape are defined. The variable r is the radial distance from the rotational axis of the surface 38 and Z is the distance from a plane perpendicular to the axis. The shape of the lens surface 38 can be expressed by the power series:

$$Z = Ar^2 + Br^3 + Cr^4 + Dr^5 + \ldots$$

Where A, B, C, D, ... are coefficients which determine the shape of the lens surface 38.

In the preferred embodiment of the present invention, the internal surfaces 24, 30 are purely aspheric (equivalently, zero spherical curvature). In the present specification, a 'purely aspheric' shape is defined to have A=0. The power series describing the shapes of the internal surfaces 24, 30 preferably have no component proportional to $r^2$. The compensation lenses 20, 26 are said to have an absence of spherical power, which is essentially equivalent to having zero focal power or having an infinitely long focal length.

Preferably, the internal surfaces 24, 30 have complementary shapes so that the air gap spacing 34 thickness is the same at all points between the compensation lenses. However, it is within the scope of the present invention for the internal surfaces 24, 30 to have noncomplementary shapes.

Due to the absence of an $r^2$ term in the power series which describes the internal surfaces 24, 30, the lenses 20, 26 have an infinitely long focal length. Focal length is defined only for lenses with spherical ($r^2$) curvature. However, the lenses 20, 26 will tend to bend light passing through them even if they are purely aspheric. Paraxial light rays (near the axis 32) will be bent less than nonparaxial light rays (far from the axis 32). This difference in behavior between paraxial and nonparaxial regions is accurately determined by the shapes of the internal surfaces 24, 30 and the thickness of the air gap spacing 34. The coefficients B, C, D and higher power coefficients of the internal surfaces are selected such that the compensation lenses together provide a desired amount of spherical aberration for a desired air gap spacing. Reference can be made to *Modern Lens Design: A Resource Manual*, by Warren J. Smith, McGraw-Hill, New York, 1992 concerning the design of aspheric lenses. Also, lens design software such as ZEMAX*, sold by Focus Software in Tucson, Ariz., can be used to select the best values for the coefficients in the power series which describe the aspheric internal surfaces 24, 30. (*-trademark)

In an alternative embodiment of the present invention, the internal surfaces 24, 30 have a slightly spherical curvature (i.e., A≠0, but A is very small). In this case, the lenses 20, 26 have a finite focal length when the air gap has a nonzero thickness. The lenses 20, 26 will focus or defocus light. It is preferable for the spheric curvature component (A) to be very small so that the focusing is insignificant. For example, the spheric curvature of the lenses 20, 26 is insignificant if the focal length of the lenses 20, 26 is at least 10 times longer than the focal length of any other optical component used in combination with the lenses 20, 26. More preferably, the focal length of the lenses 20, 26 is at least 100 times longer than the focal length of any other optical component used in combination with the lenses 20, 26

The internal surfaces 24, 30 and air gap spacing together determine the amount of spherical aberration provided by the lenses. Large power series coefficients and a large air gap spacing produce a large amount of spherical aberration. If the air gap spacing is reduced, the power series coefficients must be increased to yield the same spherical aberration. Similarly, if the power series coefficients are reduced, the air gap spacing must be increased to yield the same spherical aberration.

In the preferred embodiment of the present invention, the compensation lenses 20, 26 together provide a well defined amount of positive spherical aberration which compensates for the negative spherical aberration present when focusing a light beam into a data storage medium. However, the compensation lenses may also provide negative spherical aberration or zero spherical aberration. The magnitude and polarity of spherical aberration provided depends upon the shapes of the internal surfaces 24, 30 as well as the air gap spacing 34.

In the preferred embodiment of the present invention, the external surfaces 22, 28 are planar and the internal surfaces are complementary. Therefore, when the compensation lenses 20, 26 are brought close together, the compensation lenses together act as a flat slab of glass and provide zero spherical aberration. It may be preferable when using the present invention to prevent the internal surfaces 24, 30 from coming into contact because this can cause scratching of the internal surfaces or possibly cause the internal surfaces to adhere, e.g., due to vapor locking.

A collimated light beam 40 passing through the lenses from the first compensation lens 20 to the second compensation lens 26 is largely unaffected in the paraxial region close to the axis 32. In the nonparaxial region far from the axis 32, the light beam 40 is directed towards or away from the axis 32. The light beam has substantially the same beam diameter before and after passing through the compensation lenses.

Also in the preferred embodiment, the compensation lenses 20, 26 are disposed such that the light beam 40 first passes through the lens having the concave internal surface 24 (the first compensation lens 20). This is beneficial because it assures that the beam 40 will not be reduced in diameter after passing through the compensation lenses and propagating a distance from the lenses 20, 26. Consequently, the numerical aperture of an optical system in which the compensation lenses 20, 26 are used is not reduced. However, the present invention does include the alternative arrangement where the light beam 40 first passes through the lens having the convex internal surface 30 (the second compensation lens 26).

Figure 3:
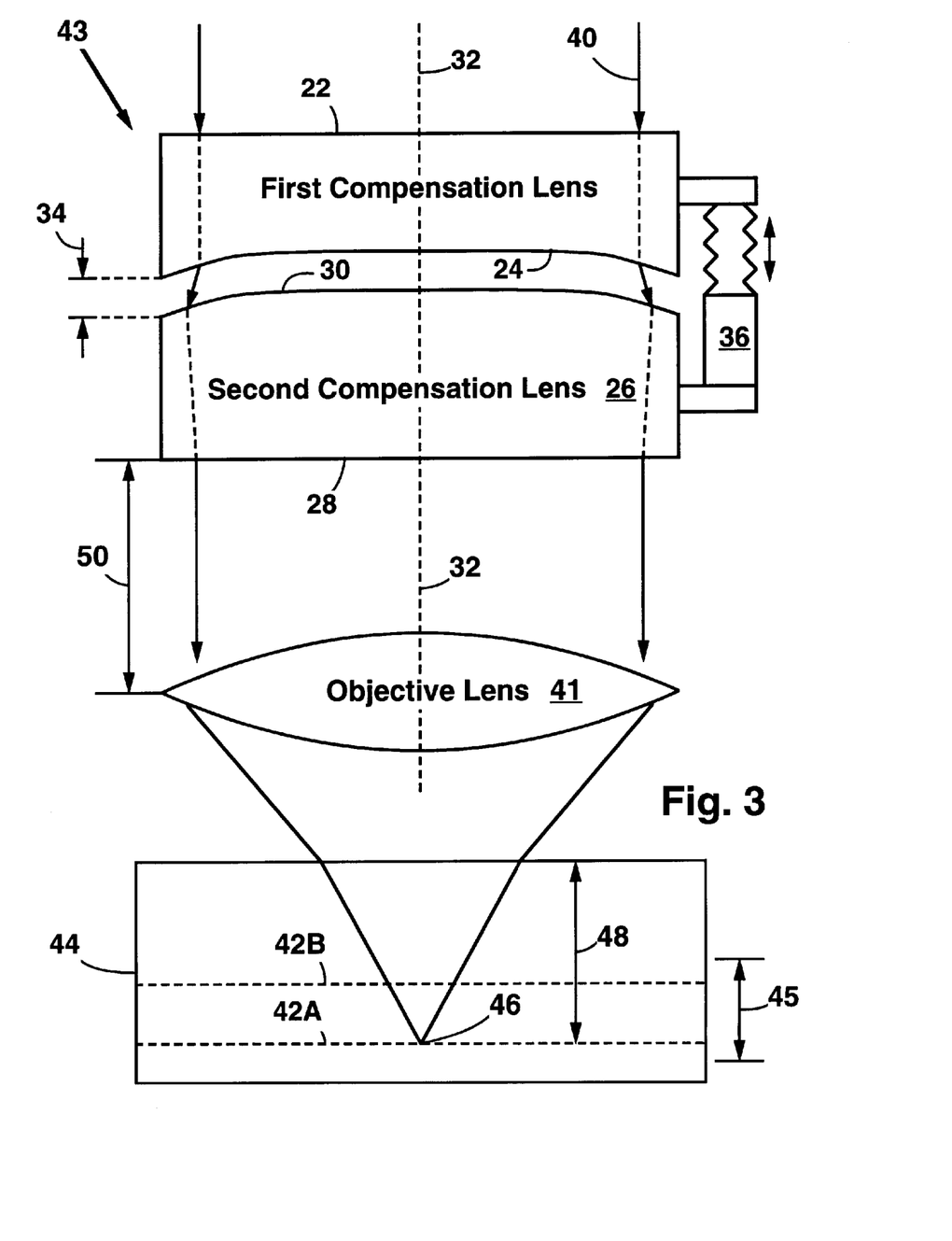
FIG. 3 is a side view of the compensation lenses being used in combination with an objective lens.

FIG. 3 shows an optical system having an objective lens 41 in addition to the first and second compensation lenses which provide spherical aberration compensation. The objective lens 41 can be a single aspheric lens or a combination of several spherical lenses, for example. The objective lens is coaxial with the axis 32. The first compensation lens 20, second compensation lens 26 and objective lens 41 together comprise a total optical system 43.

The objective lens focuses a light beam 40 to a focus spot 46 in a data storage medium 44. The focus spot is coincident with a deep data later 42A. The deep data layer and focus spot are located at a depth 48 inside the medium. A shallow data layer 42B is located at a shallow depth inside the medium. The data layer being read from is selected by moving the objective lens 41, and hence the focus spot with respect to the medium 44. The focus spot size should be as small as possible over a range 45 of depths inside the data storage medium in order to allow maximum data density and reliability when reading data from both the shallow data layer 42B and deep data layer 42A. It is best for the size of the focus spot to be diffraction limited and constant for the range 45 of depths. In order to provide a small diffraction limited focus spot size, it is best for the objective lens 41 to have a large numerical aperture.

The depth of the focus spot is determined by the distance between the objective lens 41 and the data storage medium 44. The focus spot 46 can be moved in and out of the data storage medium by moving the objective lens 41 toward or away from the data storage medium 44. As the objective is moved, the required amount of spherical aberration for maintaining a minimal focus spot size changes. The objective lens can be moved with an actuator such as a voice coil motor.

The first compensation lens 20 and the second compensation lens 26 are located on the opposite side of the objective lens 41 from the data storage medium 44. Since the compensation lenses 20, 26 have an absence of spherical power, a distance 50 between the compensation lenses and the objective lens 41 can be large compared to the size of the compensation lenses and objective lens 41. A large distance 50 does not affect the focusing and spherical aberration characteristics of the total optical system.

The absence of spherical power characteristic (due to A=0 in the power series) of the lenses 20, 26 allows the numerical aperture of the total optical system to remain constant (to within first-order) during changes in the air gap spacing 34. The numerical aperture of the total optical system 43 is determined by the objective lens 41. This ensures that the focus spot size is diffraction limited and that the diffraction limit is constant for different air gap spacing 34 thicknesses. Therefore, the size of the focus spot stays constant when the depth of the focus spot is changed. Hence, the present invention can read data from data layers located within a wide range of depths and having equal, high data densities.

An important feature of the present invention is that a change in the air gap spacing 34 thickness does not affect the depth 48 of the focus spot 46 for paraxial rays (nonparaxial rays will be affected). In other words, changes in air gap spacing does not affect the depth at which paraxial rays are focused. This is a result of the absence of spherical power characteristic (A=0) of the first compensation lens 20 and second compensation lens 26. Therefore, if the spherical aberration of the optical system is changed (by changing the air gap spacing), no focus adjustment is necessary. The focus control and spherical aberration control are decoupled. Of course, the magnitude of negative spherical aberration produced when focusing into the medium 44 changes as the focus spot depth changes.

For proper spherical aberration compensation, the air gap spacing must be changed when the depth of the focus spot 46 is changed (i.e. when the objective lens 41 is moved toward or away from the medium 44). The negative spherical aberration caused by the medium 44 changes when moving the focus spot in depth. Therefore, the positive spherical aberration supplied by the compensation lenses 20, 26 must be adjusted to compensate for this change in negative spherical aberration such that zero spherical aberration is present at the focus spot 46.

Figure 4:
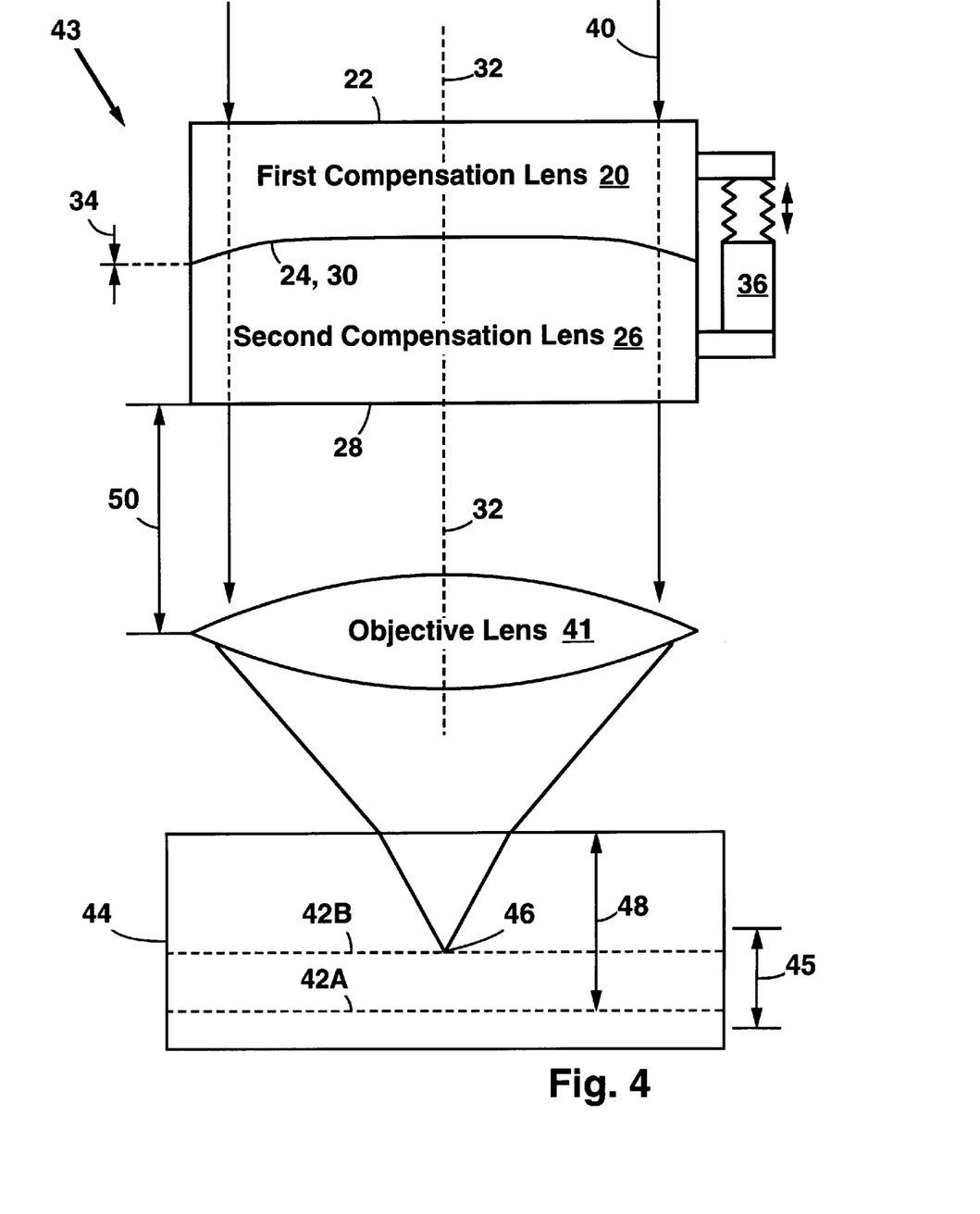
FIG. 4 is a side view of the compensation lenses being used in combination with the objective lens where the objective lens is designed with a nominal amount of positive spherical aberration such that the compensation lenses can be held substantially in contact when the objective lens is focused onto a shallow data layer.

The objective lens 41 may be designed with a nominal amount of positive or negative spherical aberration. The objective lens 41 can then be used with lenses 20, 26 which provide an adjustable amount of spherical aberration which adds to the spherical aberration of the objective lens 41. In a particularly useful embodiment shown in FIG. 4, the objective lens 41 is designed with a predetermined amount of positive spherical aberration which compensates for the negative aberration present when focused on the shallow data layer 42B. Therefore, no additional positive spherical aberration compensation is required and the compensation lenses 20, 26 are held substantially in contact so that they provide zero spherical aberration. Only when focusing onto the deep data layer 42A is the air gap spacing 34 nonzero. The air gap spacing 34 is increased when focusing to deeper depths in the medium 44.

A high numerical aperture beam, generated e.g. by a high numerical aperture objective lens 41, generally incurs substantial spherical aberration when the beam is focused into the medium. The negative spherical aberration is larger and has high-order components. The high-order components increase disproportionately faster than the low-order contributions as the numerical aperture is increased. Therefore, when used with a high numerical aperture objective lens 41, the compensation lenses 20, 26 should have internal surfaces 24, 30 which are described by a power series with high-order terms to correct for the high-order components of the spherical aberration. The power series describing the internal surfaces 24, 30 can have nonzero coefficients up to about $r^8$ or $r^9$, for example. The use of compensation lenses 20, 26 with internal surfaces described by such high power components allows for accurate compensation of severe spherical aberration which occurs when using an objective lens having a high numerical aperture to focus into the medium 44. Reference can be made to *Modern Lens Design: A Resource Manual*, by Warren J. Smith, McGraw-Hill, New York, 1992 concerning the design of aspheric surfaces with high-order power series components.

The present invention includes the option of making the internal surfaces 24, 30 slightly different aspheric shapes so that they are not complementary. The compensation lenses 20, 26 can then provide a nominal amount of spherical aberration compensation even when the internal surface 24, 30 are held substantially in contact.

Also, the external surfaces 22, 28 can be aspheric. The compensation lenses 20, 26 can then provide a nominal amount of spherical aberration compensation even when the internal surfaces 24, 30 are held substantially in contact. The external surfaces could be concave or convex, depending upon whether positive or negative spherical aberration is desired when the compensation lenses are in contact.

The absence of spherical curvature in the compensation lenses 20, 26 allows constant data density to be achieved over a wide range of depths in a data storage medium 44. Also, the absence of spherical curvature allows the compensation lenses to be placed far from the objective lens 41. Further, the absence of spherical curvature allows the spherical aberration control to be mechanically decoupled from the focus control over a large depth range 45 in the medium 44.

It is noted that the benefits of zero spherical curvature (A=0) are largely preserved if only a small amount of spherical curvature is present in the internal surfaces 24, 30. For example, the lenses 20, 26 can have a combined focal length which is at least about 10 times longer than the focal length of the objective lens 41. In this case, the lenses 20, 26 will have a relatively insignificant effect upon the focusing of the total optical system 43. The focal length is finite only when A≠0 in the power series which describes the internal surfaces. In this case, the net focal length of the lens pair 20 & 26 will change when the air gap spacing changes. More preferably, the lenses 20, 26 have a combined focal length which is at least about 100 times longer than the focal length of the objective lens 41.

Figure 5:
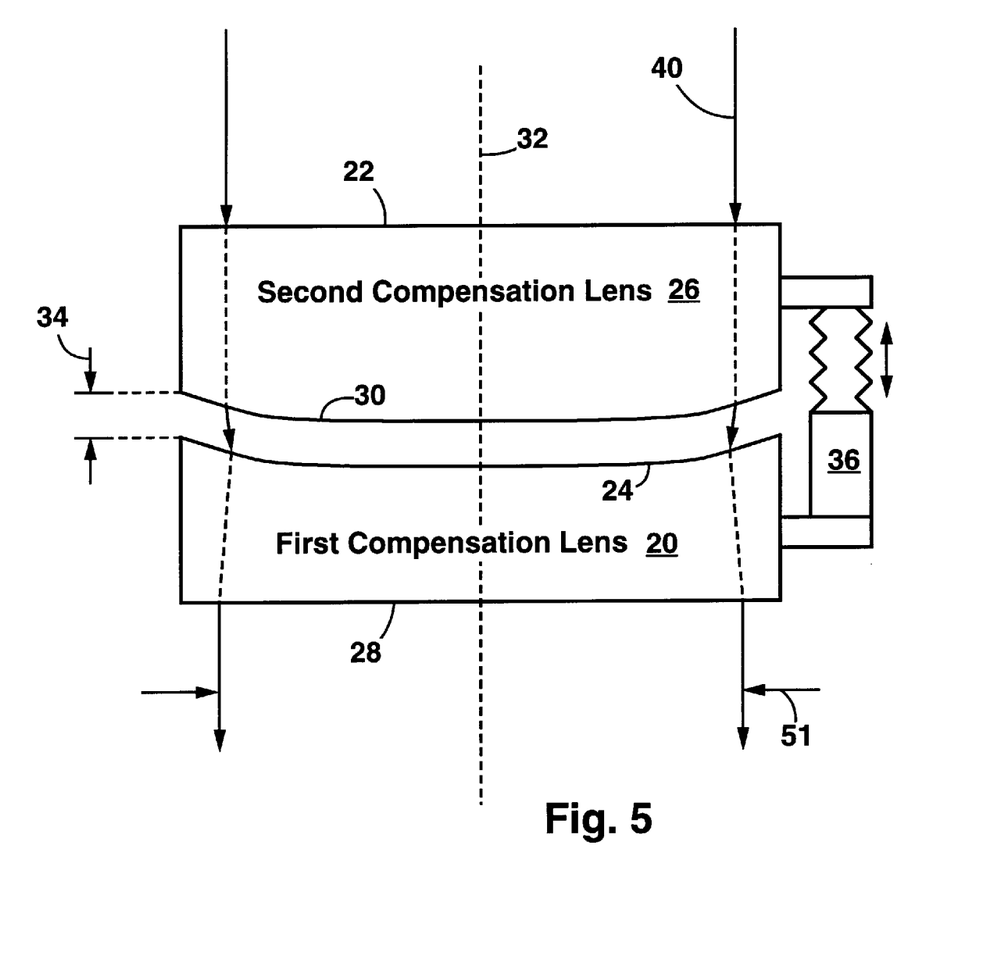
FIG. 5 is a side view of an alternative embodiment where the lenses are arranged such that the light beam passes through the second compensation lens before passing through the first compensation lens.

FIG. 5 shows an alternative embodiment in which the lenses 20, 26 are located so that the light beam 40 passes through the first compensation lens 20 after passing through the second compensation lens 26. This embodiment also provides accurate, adjustable shperical aberration. This tends to alter a beam diameter 51 more than the presently preferred embodiment shown in FIG. 1, where the first lens 20 is located 'upstream' of the second lens 26.

Figure 6:
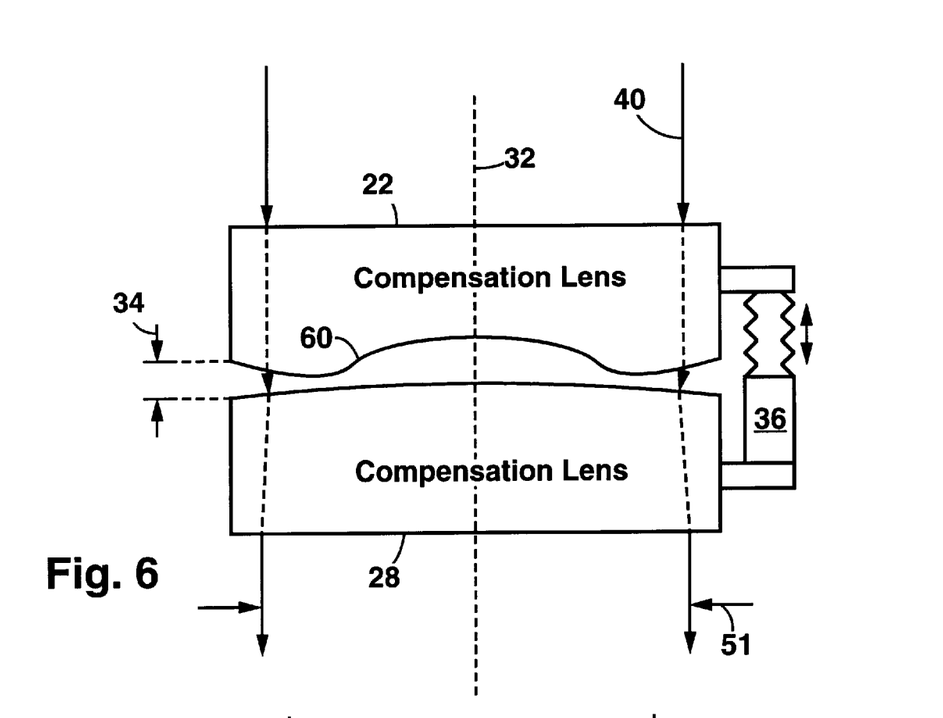
FIG. 6 is a side view of an alternative embodiment where an internal surface of a compensation lens is neither convex or concave.

It is further noted that the present invention also includes compensation lenses which are neither convex nor concave. FIG. 6 shows an embodiment of the present invention in which an internal surface 60 is neither convex nor concave. Although the embodiment shown in FIG. 6 has noncomplementary internal surfaces, it is within the scope of the present invention to have complementary internal surfaces in the case where both internal surfaces are neither convex or concave. A lens pair with neither convex or concave internal surfaces can provide correction for high-order aberrations (i.e., high order components in a power series).

The present invention can use optical elements other than lenses with shaped surfaces. For example, the present invention can use GRIN lenses which typically have a flat, planar shape. More generally, then, the present invention can be described as including a pair of optical elements (first and second optical elements) each having an aspheric refractive characteristic. An optical element with an aspheric refractive characteristic is defined as an element which bends light in a manner similar to an aspheric lens. A GRIN lens, for example, can bend light in a manner similar to an aspheric lens even though it does not have an aspheric surface. Obviously, aspheric lenses are also considered to be optical elements having an aspheric refractive characteristic. Other examples of optical elements which have an aspheric refractive characteristic include diffractive optical devices, holograms, and mirrors. Therefore, diffracting, hologrpahic, reflective or mixed approaches may also be used.

Figure 7:
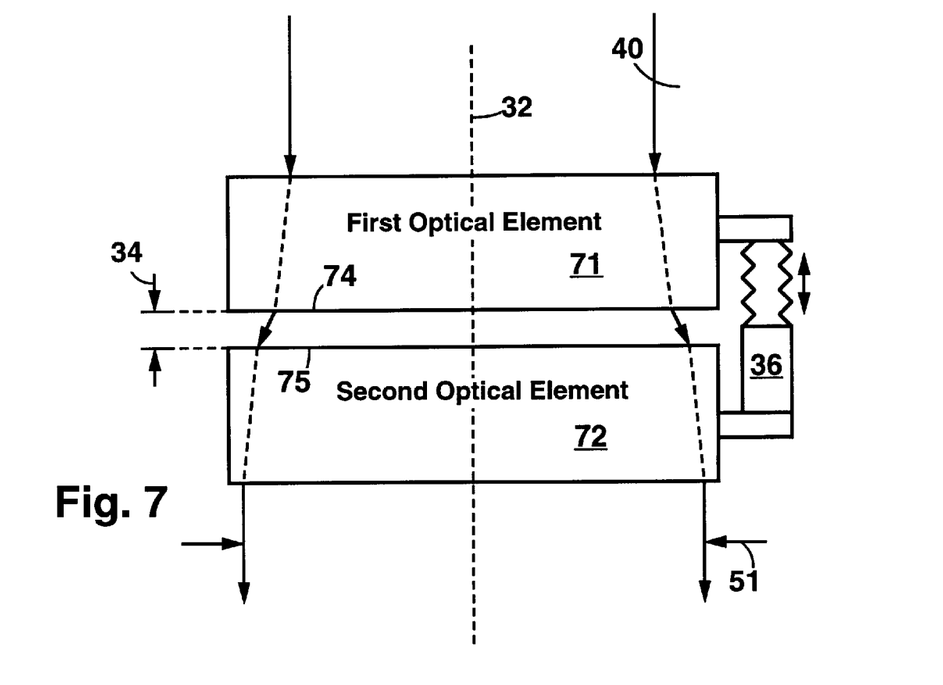
FIG. 7 is a side view of an alternative embodiment of the present invention which includes GRIN lenses, or more generally, optical elements each having an aspheric refractive characteristic.

FIG. 7 shows an embodiment of the present invention in which a first optical element 71 and a second optical element 72 are GRIN lenses. The GRIN lenses must have refractive index profiles which provide aspheric refractive characteristics which mimic conventional aspheric lenses. The apparatus of FIG. 7 can be used with an objective lens by replacing the first and second compensation lenses 20, 26 in FIG. 3 or 4 with the GRIN lenses 71, 72. Also, a GRIN lens 71 or 72 can be used in combination with an aspheric lens 20 or 26 to provide the apparatus of the present invention.

The first optical element 71 is located upstream from the second optical element 72. The first optical element 71 has a first internal surface 74 and the second optical element 72 has a second internal surface 75. The first and second internal surfaces 74, 75 define the air gap spacing 34. As shown in FIG. 7, it is preferable for the first optical element 71 to have a light diverging characteristic and the second optical element 72 to have a light converging characteristic. This preference is analogous to the preference for the concave first compensation lens 20 to be located upstream from the convex second compensation lens 26 as shown in FIG. 1.

Alternatively, the first optical element 71 (located upstream) has a converging characteristic and the second optical element 72 (located downstream) has a diverging characteristic.

In the more general description of the present invention in terms of optical elements, the pair of optical elements can provide positive spherical aberration so that they may be used in applications where negative spherical aberration needs to be offset. Also, it is preferable for the pair of optical elements each to have a purely aspheric refractive characteristic such that they mimic purely aspheric lenses. A pair of such optical elements has an infinitely long focal length.

Although the present invention has been shown in use with a data storage medium 44 having two data layers 42A, 42B, the present invention can be used with a data storage medium having almost any number of data layers.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for providing spherical aberration in a light beam, the apparatus comprising:
   a) a first optical element having an aspheric refractive characteristic and a first internal surface;
   b) a second optical element having an aspheric refractive characteristic and a second internal surface, the second element being disposed adjacent to the first element such that an air gap spacing is defined between the first and second internal surfaces, and wherein the optical elements are disposed such that the light beam passes through the first optical element before entering the second optical element;
   wherein the first internal surface and the second internal surface have complementary shapes;
   whereby the amount of spherical aberration is determined by a thickness of the air gap spacing.

2. The apparatus of claim 1 wherein the first optical element and the second optical element together provide positive spherical aberration.

3. The apparatus of claim 1 wherein the first optical element and the second optical element each have an infinitely long focal length.

4. The apparatus of claim 1 wherein the first optical element has a diverging characteristic and the second optical element has a converging characteristic.

5. The apparatus of claim 1 wherein the first optical element has a converging characteristic and the second optical element has a diverging characteristic.

6. The apparatus of claim 1 wherein the first optical element is a GRIN lens.

7. The apparatus of claim 1 wherein the second optical element is a GRIN lens.

8. The apparatus of claim 1 wherein the first optical element is an aspheric lens.

9. The apparatus of claim 1 wherein the second optical element is an aspheric lens.

10. The apparatus of claim 1 wherein the first optical element and the second optical element each have purely aspheric refractive characteristics.

11. The apparatus of claim 1 wherein the first optical element is an aspheric lens and the first internal surface is aspheric and neither concave or convex.

12. The apparatus of claim 1 wherein the second optical element is an aspheric lens and the second internal surface is aspheric and neither concave or convex.

13. An apparatus for providing spherical aberration and focusing of a light beam, the apparatus comprising:
   a) a first optical element having an aspheric refractive characteristic and a first internal surface;
   b) a second optical element having an aspheric refractive characteristic and a second internal surface, the second element being disposed adjacent to the first element such that an air gap spacing is defined between the first and second internal surfaces, and wherein the optical elements are disposed such that the light beam passes through the first optical element before entering the second optical element; and
   c) an objective lens assembly disposed coaxial with the first optical element and the second optical element and located such that the light beam passes through the second optical element before passing through the objective lens;
   wherein the first internal surface and the second internal surface have complementary shapes;
   whereby the amount of spherical aberration compensation is determined by a thickness of the air gap spacing.

14. The apparatus of claim 13 wherein the first optical element and the second optical element each have an infinitely long focal length.

15. The apparatus of claim 13 wherein the first optical element has a diverging characteristic and the second optical element has a converging characteristic.

16. The apparatus of claim 13 wherein the first optical element has a converging characteristic and the second optical element has a diverging characteristic.

17. The apparatus of claim 13 wherein the first optical element and the second optical element together provide positive spherical aberration.

18. The apparatus of claim 13 further comprising an actuator means for varying the air gap spacing.

19. The apparatus of claim 13 wherein the first optical element and the second optical element together have a focal length which is at least 10 times longer than the focal length of the objective lens.

20. The apparatus of claim 19 wherein the first optical element and the second optical element together have a focal length which is at least 100 times longer than the focal length of the objective lens.

21. The apparatus of claim 13 wherein the first optical element and the second optical element each have purely aspheric refractive characteristics.

22. An apparatus for providing spherical aberration in a light beam, the apparatus comprising:
   a) a first compensation lens having a first external surface and a convex internal surface, wherein the convex internal surface has an aspheric shape;
   b) a second compensation lens having a second external surface and a concave internal surface, wherein the concave internal surface has an aspheric shape, the second compensation lens being disposed with respect to the first compensation lens such that the convex internal surface and the concave internal surface face each other and define an air gap spacing therebetween;
   wherein the convex internal surface and the concave internal surface have complementary shapes;

whereby the amount of spherical aberration is determined by a thickness of the air gap spacing.

23. The apparatus of claim 22 wherein the internal surfaces are purely aspheric.

24. The apparatus of claim 22 wherein the external surfaces are planar.

25. The apparatus of claim 22 further comprising an actuator means for varying the air gap spacing.

26. The apparatus of claim 22 wherein the first compensation lens and the second compensation lens together provide positive spherical aberration.

27. The apparatus of claim 22 wherein the first compensation lens and the second compensation lens each have an infinitely long focal length.

28. The apparatus of claim 22 wherein the first compensation lens and the second compensation lens are disposed such that the light beam enters the first compensation lens through the first external surface and exits the second compensation lens through the second external surface.

29. The apparatus of claim 22 wherein the first compensation lens and the second compensation lens are disposed such that the light beam enters the second compensation lens through the second external surface and exits the first compensation lens through the first external surface.

30. An apparatus for providing spherical aberration compensation and focusing of a light beam, the apparatus comprising:
   a) a first compensation lens having a first external surface and a convex internal surface, wherein the convex internal surface has an aspheric shape;
   b) a second compensation lens having a second external surface and a concave internal surface, wherein the concave internal surface has an aspheric shape, the second compensation lens being coaxially disposed with respect to the first compensation lens such that the convex internal surface and the concave internal surface face each other and define an air gap spacing therebetween;
   c) an objective lens assembly disposed coaxial with the first compensation lens and the second compensation lens;

wherein the convex internal surface and the concave internal surface have complementary shapes;

whereby the amount of spherical aberration compensation is determined by a thickness of the air gap spacing.

31. The apparatus of claim 30 wherein the objective lens is disposed closer to the second compensation lens than the first compensation lens.

32. The apparatus of claim 30 wherein the external surfaces are planar.

33. The apparatus of claim 30 wherein the first compensation lens and the second compensation lens together have a focal length which is at least 10 times longer than the focal length of the objective lens.

34. The apparatus of claim 33 wherein the first compensation lens and the second compensation lens together have a focal length which is at least 100 times longer than the focal length of the objective lens.

35. The apparatus of claim 30 wherein the first compensation lens and the second compensation lens together provide positive spherical aberration.

36. The apparatus of claim 30 wherein the first compensation lens and the second compensation lens each have an infinitely long focal length.

37. The apparatus of claim 30 wherein the first compensation lens and the second compensation lens are disposed such that the light beam enters the first compensation lens through the first external surface and exits the second compensation lens through the second external surface.

38. The apparatus of claim 30 wherein the first compensation lens and the second compensation lens are disposed such that the light beam enters the second compensation lens through the second external surface and exits the first compensation lens through the first external surface.

39. The apparatus of claim 30 further comprising an actuator means for varying the air gap spacing.

40. The apparatus of claim 30 wherein the internal surfaces are purely aspheric.

* * * * *

UNITED STATES PATENT AND TRADEMARK OFFICE
CERTIFICATE OF CORRECTION

PATENT NO. : 5,995,292
DATED : November 30, 1999
INVENTOR(S) : Mark E. McDonald

It is certified that error appears in the above-identified patent and that said Letters Patent is hereby corrected as shown below:

Title page, item [75] inventor: should read --Mark E. McDonald--.

Signed and Sealed this

Twenty-fifth Day of July, 2000

Attest:

Q. TODD DICKINSON

*Attesting Officer*  *Director of Patents and Trademarks*